United States Patent
Goria et al.

(10) Patent No.: US 12,088,153 B2
(45) Date of Patent: Sep. 10, 2024

(54) ELECTRIC MOTOR SYSTEM, FAN MODULE FOR A VEHICLE AND ELECTRICAL CONNECTOR

(71) Applicant: JOHNSON ELECTRIC ASTI S.R.L., Turin (IT)

(72) Inventors: Enis Goria, Asti (IT); Luciano Bedin, Asti (IT)

(73) Assignee: JOHNSON ELECTRIC ASTI S.R.L., Turin (IT)

( * ) Notice: Subject to any disclaimer, the term of this patent is extended or adjusted under 35 U.S.C. 154(b) by 238 days.

(21) Appl. No.: 17/548,238

(22) Filed: Dec. 10, 2021

(65) Prior Publication Data
US 2022/0103047 A1  Mar. 31, 2022

Related U.S. Application Data

(63) Continuation of application No. PCT/EP2020/066026, filed on Jun. 10, 2020.

(30) Foreign Application Priority Data

Jun. 10, 2019  (IT) ................. 102019000008463

(51) Int. Cl.
*H02K 11/33* (2016.01)
*B60R 16/033* (2006.01)
(Continued)

(52) U.S. Cl.
CPC ........... *H02K 11/33* (2016.01); *B60R 16/033* (2013.01); *H02K 5/225* (2013.01); *H02K 9/06* (2013.01)

(58) Field of Classification Search
CPC ........... B60L 1/003; B60L 3/04; H02K 11/33; H02K 2211/03; H02K 5/225; H02K 7/14; H02K 9/06; B60R 16/033; Y02T 10/64
See application file for complete search history.

(56) References Cited

U.S. PATENT DOCUMENTS

| | | | | |
|---|---|---|---|---|
| 6,324,038 B1* | 11/2001 | Kishibe | ................. | B60L 3/003 361/87 |
| 2012/0068644 A1* | 3/2012 | Tsuji | ..................... | B60L 3/003 318/400.21 |
| 2013/0286514 A1* | 10/2013 | Oguchi | ................. | H02P 3/18 361/31 |

FOREIGN PATENT DOCUMENTS

EP  2031135 A1  3/2009

OTHER PUBLICATIONS

International Search Report and Written Opinion from corresponding PCT application No. PCT/EP2020/066026 Nov. 2, 2020.

* cited by examiner

*Primary Examiner* — Naishadh N Desai
(74) *Attorney, Agent, or Firm* — Aird & McBurney LP (57) ABSTRACT

The invention relates to an electric motor system (1) for a vehicle, which comprises an electric motor (M) having two power terminals configured to be connected to a power supply line (KL30) and a reference potential line (KL31), and a signal terminal. The electric motor system (1) further comprises a switch element (D) with a first end configured to connect the power supply line (KL30), and a second end connected to a corresponding power terminal of the electric motor (M), and a driving circuit (HS) configured to monitor whether the electric motor (M) has a malfunction and control the switch element (D) correspondingly, a logic portion of a motor driving circuit is configured to be connected and powered by a key line (KL15) carrying a voltage indicative of the ignition status of the vehicle. The invention further provides a fan module for a vehicle.

13 Claims, 4 Drawing Sheets

(51) Int. Cl.
*H02K 5/22* (2006.01)
*H02K 9/06* (2006.01)

ELECTRIC MOTOR SYSTEM, FAN MODULE FOR A VEHICLE AND ELECTRICAL CONNECTOR

CROSS REFERENCE TO RELATED APPLICATIONS

This non-provisional patent application is continuation application of PCT Application No. PCT/EP2020/066026, filed on Jun. 10, 2020, which claims priority to Italian Patent Application No. 102019000008463, filed on Jun. 10, 2019, all of which are incorporated herein by reference in their entirety.

TECHNICAL FIELD

The invention relates to the field of motor technology, in particular to an electric motor system, a fan module for a vehicle and an electrical connector for an electric motor of a vehicle.

BACKGROUND

Figure 1:
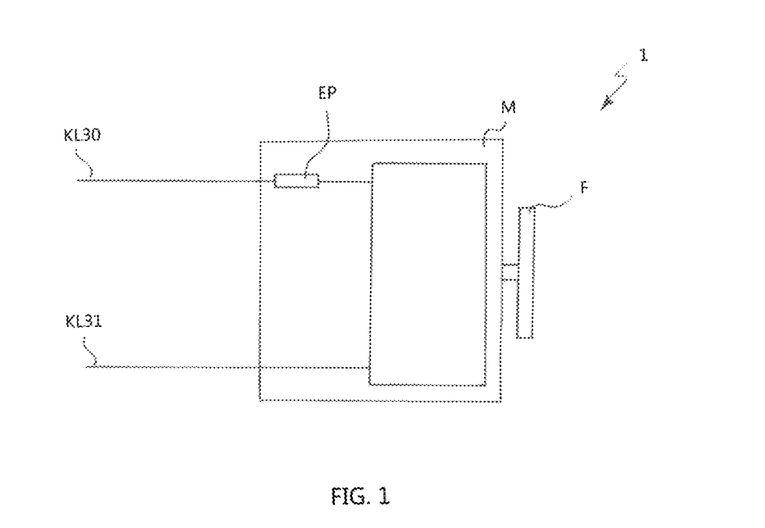
FIG. 1 illustrates an existing electric motor configured to drive a fan.

Referring to FIG. 1, an existing electric motor system 1 includes an electric motor M configured to drive a cooling fan F of a fan module of a vehicle. The electric motor M is powered by a battery through a power supply line KL30 and a reference potential line KL31. The electric motor M usually has a thermal fuse EP configured to open the power supply line KL30 in the event of an overcurrent, and therefore preventing excessive current from damaging the electric motor M.

However, the existing electric motor system 1 has the following disadvantages. The thermal fuse EP only can open the power supply line KL31 once the overcurrent has occurred. The thermal fuse EP is irreparably damaged in the event of an overcurrent, so it is necessary to replace the thermal fuse EP in order to restart an operation of the electric motor M.

In addition, the electric motor M always receives the power supply through the power supply line KL30 and the reference potential line KL31, even when the vehicle is in a sleep rest mode. Therefore, the electric motor M is exposed to potential differences which in some cases it may generate a short circuit or increase in a leakage current, which may cause damage to the electric motor M due to overheating. The sleep rest mode is well known in the field to indicate a mode which may be activated after the vehicle has been inactive for a predetermined period of time. In the sleep rest mode, most subsystems of the vehicle are switched to an off or inactive state.

SUMMARY

It is the object of the present invention to provide an electric motor system, a fan module for a vehicle, and an electrical connector for an electric motor of a vehicle.

According to one aspect of the present invention, an electric motor system is provided which can realize a disconnected and safe state of the electric motor when the vehicle is off or in a sleep rest mode. The electric motor system comprises an electric motor M having two power terminals configured to be connected to a power supply line and a reference potential line to be powered by a battery of the vehicle, and a signal terminal configured to receive control commands from a control unit. The electric motor system 1 further comprises a switch element, a first end of the switch element is configured to connect the reference potential line, a second end of the switch element is connected to a corresponding power terminal of the electric motor, and a control end of the switch element is configured to connect a key line carrying a voltage indicative of an ignition status of the vehicle.

According to another aspect of the present invention, an electric motor system is provided which can intervene to protect the electric motor prior to an occurrence of overcurrent or short circuit, restart an operation of the electric motor without replacing the thermal fuse mentioned before. The electric motor system comprises an electric motor having two power terminals configured to be connected to a power supply line and a reference potential line to be powered by a battery of the vehicle, and a signal terminal; and a control unit configured to connect the signal terminal of the electric motor for sending control commands. The electric motor system further comprises a switch element and a switch, the switch element being connected between the reference potential line and a corresponding power terminal of the electric motor, a control end of the switch element being connected to a voltage source via a switch. The control unit is further configured to monitor whether the electric motor has a malfunction and control the switch correspondingly. When the electric motor has the malfunction, the control unit turns off the switch.

According to still another aspect of the present invention, an electric motor system is provided, which can intervene to protect the electric motor prior to an occurrence of overcurrent or short circuit, restart an operation of the electric motor without replacing the thermal fuse mentioned before, and realize a disconnected and safe state of the electric motor when the vehicle is off or in a sleep rest mode. The electric motor system comprises an electric motor having two power terminals configured to be connected to a power supply line and a reference potential line to be powered by a battery of the vehicle, a signal terminal configured to receive control commands from a control unit. The electric motor system further comprises a switch element with a first end configured to connect the power supply line, and a second end connected to a corresponding power terminal of the electric motor, and a driving circuit configured to monitor whether the electric motor has a malfunction and control the switch element correspondingly. A logic portion of a motor driving circuit is configured to be connected and powered by a key line carrying a voltage indicative of the ignition status of the vehicle.

According to still another aspect of the present invention, a cooling fan module for a vehicle is provided, which includes an electric motor system described before, and a fan coupled to an electric motor of the electric motor system.

According to still another aspect of the present invention, an electrical connector for an electric motor for a vehicle is provided, which comprises a plurality of conductive terminals configured to be coupled to a mating connector, and a plurality of cables configured to connect the electric motor. The conductive terminals comprise a first terminal for receiving a voltage from a power supply line, a second terminal for receiving a reference potential from a reference potential line, a third terminal for receiving a voltage indicative of an ignition status of the vehicle and/or a voltage indicative of an operating status of the electric motor, and a signal terminal for receiving control commands from a control unit. The cables comprise a first cable connected to the first terminal, a second cable, a third cable connected to the third terminal, and a signal cable connected to the signal terminal. The electrical connector further comprises a printed circuit board with a switch element which is connected between the second cable and the second terminal and controlled by the third cable.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE EMBODIMENTS

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

Figure 2:
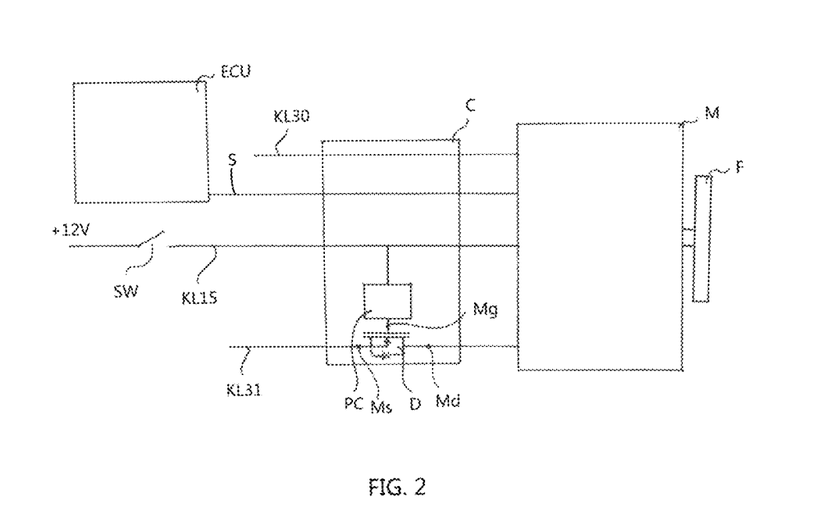
FIG. 2 illustrates an electric motor system according to a first embodiment of the present invention.

Referring to FIG. 2, the electric motor system according to the first embodiment of the present invention includes an electric motor M and a switch element D. The electric motor M has two power terminals configured to be connected to a power supply line KL30 and a reference potential line KL31, so that it is powered by a battery of the vehicle. The electric motor M further includes a signal terminal configured to receive control commands from a signal line S of a control unit ECU.

The power supply line KL30 and the reference potential line KL31 are used to provide a power supply for driving the motor to rotate. The control commands are used to control activation, deactivation, and/or a rotate speed of the electric motor M. For example, the commands can be generated by the control unit ECU according to whether it is necessary to cool a radiator of the vehicle by a fan.

A first end of the switch element D is configured to connect the reference potential line KL31, a second end of the switch element D is configured to connect to a corresponding power terminal of the electric motor M, and a control end of the switch element D is configured to connect a key line KL15 carrying a voltage indicative of an ignition status of the vehicle.

An ignition switch SW is connected between the key line KL15 and a voltage source which may be +12V. Therefore, when the ignition switch SW is on, the key line KL15 carries a high voltage. When the ignition switch SW is off, the key line KL15 carries a low voltage. The ignition switch SW is on or off according to an ignition status of the vehicle, or generally the position or presence of a vehicle ignition key, or more generally, the ignition switch SW is on when the vehicle is on, and the ignition switch SW is off when the vehicle is off or in a sleep rest mode.

The switch element D is configured to allow or prevent, the power supply to the electric motor M, depending on a voltage of the key line KL15. Preferably, the switch element D prevents the power supply to the electric motor M, when the voltage of the key line KL15 is low. For example, when the voltage of the key line KL15 is zero, the switch element D disconnects the reference potential line KL31 and the corresponding power terminal of the electric motor M.

In this way, it is ensured that the electric motor M is in a safe and de-energized state when the ignition switch SW is off. Since the electric motor is de-energized, short circuits in the electric motor M cannot occur.

Figure 6:
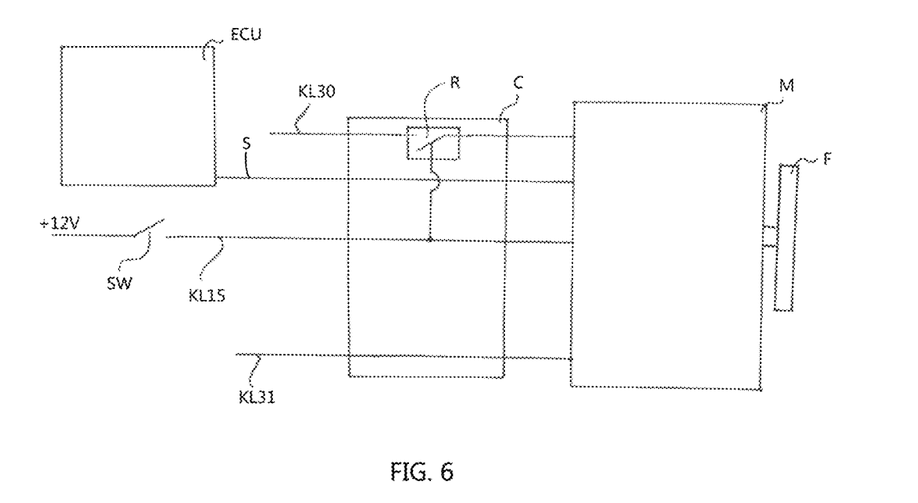
FIG. 6 illustrates an electric motor system according to a fourth embodiment of the present invention.

Preferably, the switch element D is a mosfet, preferably an n-mosfet. The gate electrode Mg of the mosfet is connected to the key line KL15, the source electrode Ms of the mosfet is connected to the reference potential line KL31 and the drain electrode Md of the mosfet is connected to the corresponding power terminal of the electric motor M. Therefore the voltage of the key line KL15 controls whether the mosfet is turned on or turned off. In an alternative embodiment, the switch element D can be a reply, as shown in FIG. 6.

Preferably, the electric motor system further includes an electrical protection circuit PC connected between the switch element D and the key line KL15, and arranged to protect the switch element D in case of transients on the key line KL15. In one embodiment, the electrical protection circuit PC includes at least one zener diode and a resistor.

Figure 3:
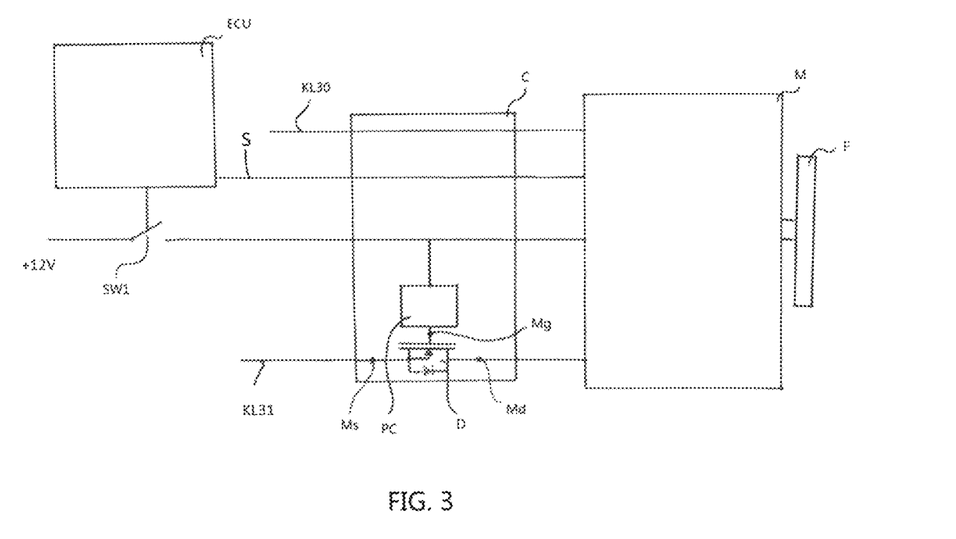
FIG. 3 illustrates an electric motor system according to a second embodiment of the present invention.

FIG. 3 illustrates an electric motor system according to a second embodiment of the present invention. In the second embodiment, a switch SW1 is connected between a control end of the switch element D and the voltage source which may be +12V. The switch SW1 is controlled by the control unit ECU. The control unit ECU further monitors an information indicative of an operating status of the electric motor M. The information may be transmitted via the signal line S.

The switch SW1 may be a relay. Preferably, when the ignition status of the vehicle is switched to be on, the control unit ECU is woken up and turns on the switch SW1. When the ignition status of the vehicle is switched to be off, the control unit ECU turns off the switch SW1.

Unlike the first embodiment in which the switch SW is controlled according to the position/presence of the key, the control unit ECU can now control a switch SW1 connected between the +12V voltage source and the control end of the switch element D. The control unit ECU turns on the switch SW1 so as to allow the control end of the switch element D to be powered by the +12V voltage source, if it receives an information that confirms a correct operation of the electric motor M. Or, the ECU control turns off the switch SW1 so as to not allow the control end of the switch element D to be powered by the +12V voltage source, if it receives an information that confirms a malfunction of the electric motor M.

In the embodiment, the information may be a heartbeat signal from the electric motor M. If the control unit ECU keeps receiving the heartbeat signal, it indicates that the electric motor M does not have a malfunction. If the heartbeat signal disappears, it indicates that the electric motor M has a malfunction.

In an alternative embodiment, the electric motor M may send an error signal to the control unit ECU to indicate a malfunction, when the electric motor M has the malfunction.

When the switch SW1 is off, the gate electrode Mg of the mosfet is not connected to the voltage source, the gate electrode Mg of the mosfet has a low voltage, i.e. lower than a predetermined threshold. This low voltage at the gate electrode Mg of the mosfet will ensure that there is no conduction between the source electroe Ms and the drain electrode Md of the mosfet, and therefore, the reference potential line KL31 will not be connected to a corresponding power terminal of the electric motor M.

The electric motor M of the first and second embodiments is preferably a brushless direct current (BLDC) motor. Preferably, the control end of the switch element D is further connected to a logic portion of a motor driving circuit of the electric motor M, so that the logic portion could be powered by the voltage source which may be +12V. The voltage source at the control end of the switch D is not used to provide a power to drive the electric motor M, but used to provide a power to wake-up or power the logic portion. Once the logic portion of the motor driving circuit is powered, it performs a self-check, and sends an information which indicates if the electric motor M has a malfunction, to the control unit ECU. In addition, if the control commands from the control unit ECU are lost, the electric motor M may be driven at full speed.

The motor driving circuit may include an inverter and a PWM output circuit. The logic portion may include the PWM output circuit for outputting a series of pulse signals to the inverter.

The electrical protection circuit PC and/or the switch element D shown in FIGS. 2-3 can be integrated inside an electrical connector C connected to the electric motor M. Further referring to FIG. 4, the electrical connector C includes a plurality of conductive terminals configured to be coupled to a mating connector, a plurality of cables configured to connect the electric motor M, and a printed circuit board PCB. The conductive terminals includes a first terminal T1 for receiving a voltage from a power supply line KL30, a second terminal T2 for receiving a reference potential from a reference potential line KL31, a third terminal T3 for receiving a voltage indicative of an ignition status of the vehicle from the key line KL15 or a voltage indicative of an operating status of the electric motor M, and a signal terminal TS for receiving control commands from a control unit ECU.

Figure 4:
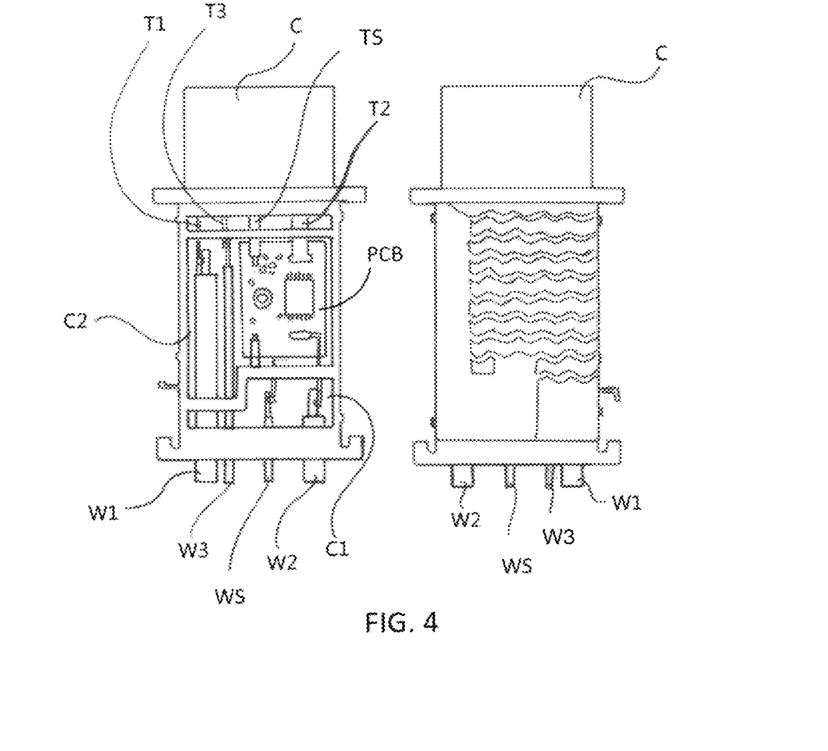
FIG. 4 illustrates an electrical connector of the electric motor system of FIG. 2 or 3.

The cables include a first cable W1 connected to the first terminal T1, a second cable W2 connected to the second terminal T2 via the printed circuit board PCB, a third cable W3 connected to the third terminal T3, and a signal cable WS connected to the signal terminal TS via the printed circuit board PCB.

The switch element D and the electrical protection circuit PC are arranged on the printed circuit board PCB. The switch element D is connected between the second cable W2 and the second terminal T2 and controlled by the third cable W3.

Preferably, the electrical connector C further includes a housing with a first chamber C1 and a second chamber C2 isolated from the first chamber C1. Inside the first chamber C1, the second cable W2 and the signal cable WS are respectively connected to two conductors connecting with the printed circuit board PCB. Inside the second chamber C2, the first terminal T1 is connected to the first cable W1, the third terminal T3 is connected to the third cable W3, and the printed circuit board PCB is arranged.

The two chambers C1, C2 are used to create compartments to keep the components subject to possible high power short circuits isolated from components subject to possible low power short circuits.

Figure 5:
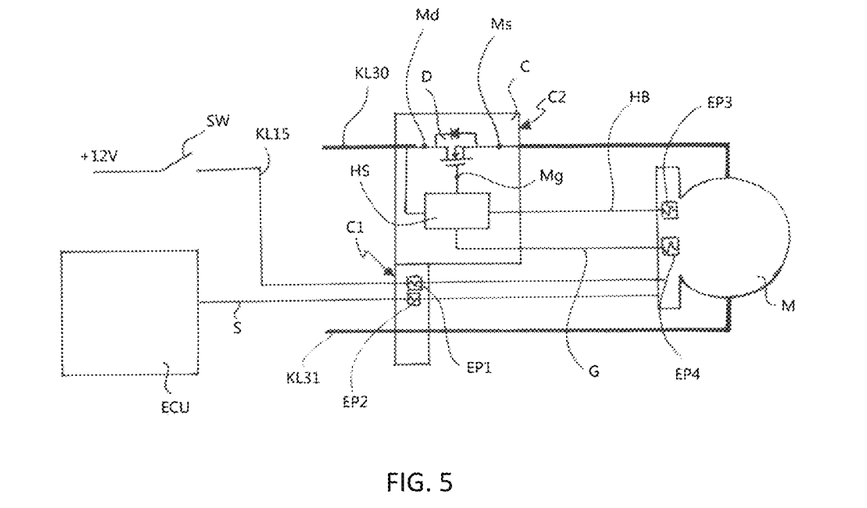
FIG. 5 illustrates an electric motor system according to a third embodiment of the present invention.

FIG. 5 illustrates an electric motor system according to a third embodiment of the present invention. In the embodiment, the electric motor system includes an electric motor M, a switch element D, and a driving circuit HS. The electric motor M has two power terminals configured to be connected to a power supply line KL30 and a reference potential line KL31, so that the electric motor M is powered by a battery of the vehicle. The electric motor M further includes a signal terminal configured to receive control commands from a signal line S of a control unit ECU.

The power supply line KL30 and the reference potential line KL31 are configured to provide a power for driving the motor to rotate. The control commands are used to control activation, deactivation, and/or a rotate speed of the electric motor M. For example, the commands can be generated by the control unit ECU according to whether it is necessary to cool a radiator of the vehicle by a fan.

A first end of the switch element D is configured to connect the power supply line KL30, and a second end of the switch element D is configured to connect to a corresponding power terminal of the electric motor M.

The driving circuit HS is preferably a high-side driving circuit, respectively connected to the power supply line KL30, a control end of the switch element D, a ground terminal G and a feedback terminal HB of the electric motor M. The driving circuit HS is configured to monitor an operating status of the electric motor M via the feedback terminal HB and control the switch element D correspondingly.

If the electric motor M does not have a malfunction, the driving circuit HS turns on the switch element D to transmit the power supply to the electric motor M. If the electric motor M has a malfunction, the driving circuit HS turns off the switch element D.

In the embodiment, the information may be a heartbeat signal from the electric motor M. If the driving circuit HS keeps receiving the heartbeat signal, it indicates that the electric motor M does not have a malfunction. If the heartbeat signal disappears, it indicates that the electric motor M has a malfunction.

In an alternative embodiment, the electric motor M may send an error signal to the driving circuit HS to indicate a malfunction, when the electric motor M has the malfunction.

In an alternative embodiment, instead of being connected to the ground terminal G of the electric motor M, the end of the driving circuit HS may be grounded by directly connecting the reference potential line KL31.

The electric motor M is preferably a brushless direct current (BLDC) motor. The key line KL15 carrying a voltage indicative of an ignition status of the vehicle is connected to the electric motor M, and configured to provide a power to wake-up or power a logic portion of a motor driving circuit of the electric motor M. Once the logic portion of the motor driving circuit is powered, it performs a self-check, and sends an information which indicates if the electric motor M has a malfunction, to the driving circuit HS.

The motor driving circuit may include an inverter and a PWM output circuit. The logic portion may include the PWM output circuit for outputting a series of pulse signals to the inverter.

Figure 7:
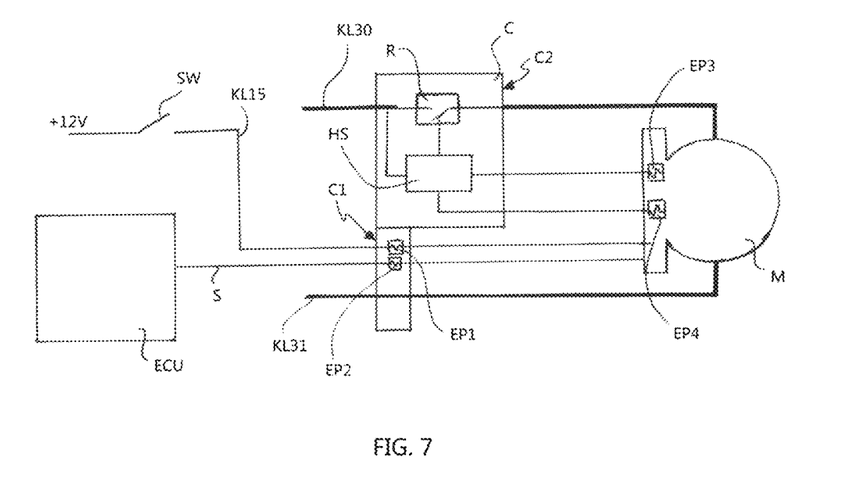
FIG. 7 illustrates an electric motor system according to a fifth embodiment of the present invention.

Preferably, the switch element D is a mosfet. The mosfet may be a p-mos or an n-mos. If the mosfet is an n-mos, the gate electrode Mg of the mosfet is connected to the driving circuit HS, the source electrode Ms of the mosfet is connected to the electric motor M and the drain electrode Md of the mosfet is connected to the power supply line KL30. In an alternative embodiment, the switch element D can be a reply, as shown in FIG. 7.

Preferably, the electric motor system further includes a first electric protection component EP1 connected between the key line KL15 and the electric motor M. The first electrical protection component EP1 is configured to limit the current on the key signal line KL15 which may reach the electric motor M and potentially cause a short circuit which may cause overheating.

Preferably, the electric motor system further includes a second electric protection component EP2 connected between the signal line S of the control unit ECU and the electric motor M.

Preferably, the electric motor system further includes a third electric protection component EP3 connected between the feedback terminal HB of the electric motor M and the driving circuit HS, and a fourth electric protection component EP4 connected between the ground terminal G of the electric motor M and the driving circuit HS. Each of the four electric protection components EP1, EP2, EP3, EP4 may be a fuse.

Preferably, the switch element D, the driving circuit HS, and the first and second electric protection components EP1, EP2 may be arranged inside the electrical connector C. The third and fourth electric protection components EP3, EP4 may be arranged inside the electric motor M.

Preferably, the electrical connector C includes a first chamber C1 and a second chamber C2 isolated from the first chamber C1. The first and second electric protection components EP1, EP2 are arranged inside the first chamber C1. The driving circuit HS and the switch element D are arranged inside the second chamber C2.

Figure 8:
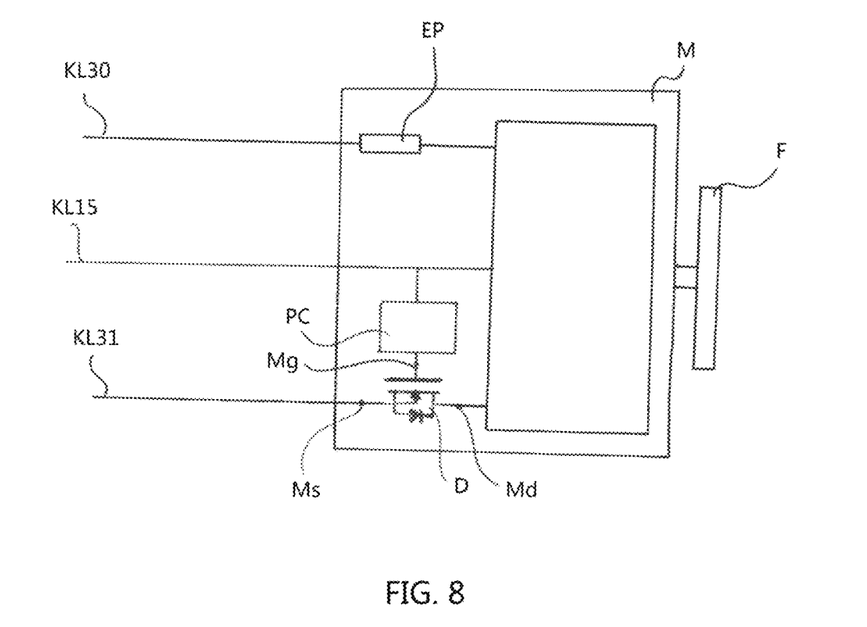
FIG. 8 illustrates an electric motor system according to a sixth embodiment of the present invention.

FIG. 8 illustrates an electric motor system according to a sixth embodiment of the present invention. The electric motor system is similar to the electric motor system shown in FIG. 1. The main difference is that the electrical protection circuit PC and the switch element D of the electric motor system of this embodiment are arranged inside the electric motor M.

The present invention also provides a fan assembly for a vehicle, which further includes a cooling fan F coupled to any one of the electric motor systems described in the above embodiments. The cooling fan F is rotated by the electric motor M of the electric motor system. The fan assembly can be coupled, for example, to a radiator of the vehicle.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. An electric motor system (1) for a vehicle, comprising:
   an electric motor (M) having two power terminals configured to be connected to a power supply line (KL30) and a reference potential line (KL31) to be powered by a battery of the vehicle, a signal terminal configured to receive control commands from a control unit (ECU);
   wherein the electric motor system (1) further comprises:
   a switch element (D) with a first end configured to connect the power supply line (KL30), and a second end connected to a corresponding power terminal of the electric motor (M);
   a driving circuit (HS) configured to monitor whether the electric motor (M) has a malfunction, and control the switch element (D) correspondingly; and
   a logic portion of a motor driving circuit is configured to be connected and powered by a key line (KL15) carrying a voltage indicative of the ignition status of the vehicle;
   the driving circuit (HS) is connected to the power supply line (KL30), a control end of the switch element (D), a feedback terminal (HB) of the electric motor (M), and a ground terminal (G) of the electric motor (M) or the reference potential line (KL31), and the driving circuit (HS) monitors whether the electric motor (M) has a malfunction via the feedback terminal (HB), and controls the switch element (D) correspondingly.

2. The electric motor system (1) for a vehicle according to claim 1, wherein, the switch element (D) is a mosfet.

3. The electric motor system (1) for a vehicle according to claim 1, wherein, the switch element (D) and the driving circuit (HS) are arranged inside a connector (C) arranged to make a connection of the power supply line (KL30), the reference potential line (KL31), the key line (KL15) and a signal line (S) of the control unit (ECU) to the electric motor (M).

4. The electric motor system (1) for a vehicle according to claim 1, wherein, the driving circuit (HS) turns on the switch element (D) when the electric motor (M) does not have a malfunction, and turns off the switch element (D) when the electric motor (M) has a malfunction.

5. The electric motor system (1) for a vehicle according to claim 1, wherein, when the driving circuit (HS) keeps receiving a heartbeat signal from the electric motor (M), the electric motor (M) does not have a malfunction; when the heartbeat signal disappears, the electric motor (M) has a malfunction.

6. The electric motor system (1) for a vehicle according to claim 1, wherein, when the logic portion of the motor driving circuit is powered, the logic portion performs a self-check, and sends an information to the driving circuit (HS), and the driving circuit (HS) monitors whether the electric motor (M) has a malfunction based on the information.

7. The electric motor system (1) for a vehicle according to claim 1, wherein, the logic portion comprises a PWM output circuit for outputting a series of pulse signals to an inverter of the motor driving circuit.

8. A cooling fan module for a vehicle, comprising the electric motor system (1) according to claim 1, and a fan (F) coupled to an electric motor of the electric motor system (1).

9. The cooling fan module according to claim 8, wherein the driving circuit (HS) is connected to the power supply line (KL30), a control end of the switch element (D), a feedback terminal (HB) of the electric motor (M), and a ground terminal (G) of the electric motor (M) or the reference potential line (KL31), and the driving circuit (HS) monitors whether the electric motor (M) has a malfunction via the feedback terminal (HB), and controls the switch element (D) correspondingly.

10. The cooling fan module according to claim 8, wherein, the driving circuit (HS) turns on the switch element (D) when the electric motor (M) does not have a malfunction, and turns off the switch element (D) when the electric motor (M) has a malfunction.

11. The cooling fan module according to claim 8, wherein, when the driving circuit (HS) keeps receiving a heartbeat signal from the electric motor (M), the electric motor (M) does not have a malfunction; when the heartbeat signal disappears, the electric motor (M) has a malfunction.

12. The cooling fan module according to claim 8, wherein, when the logic portion of the motor driving circuit is powered, the logic portion performs a self-check, and sends an information to the driving circuit (HS), and the driving circuit (HS) monitors whether the electric motor (M) has a malfunction based on the information.

13. The cooling fan module according to claim 8, wherein, the logic portion comprises a PWM output circuit for outputting a series of pulse signals to an inverter of the motor driving circuit.

\* \* \* \* \*